United States Patent [19]
Montgomery, Jr. et al.

[11] 3,748,638
[45] July 24, 1973

[54] SEISMIC EXPLORATION SYSTEM
[75] Inventors: William C. Montgomery, Jr., Houston, Tex.; William R. Orr, Bellaire, both of Tex.
[73] Assignee: Shell Oil Company, Houston, Tex.
[22] Filed: Nov. 8, 1971
[21] Appl. No.: 196,400

[52] U.S. Cl.................340/15.5 MC, 340/15.5 DP, 340/15.5 TS
[51] Int. Cl............................................. G01v 1/22
[58] Field of Search............................. 181/0.5 FS; 340/15.5 TS, 15.5 MC, 15.5 DP

[56] References Cited
UNITED STATES PATENTS
3,496,530 2/1970 Brown et al................. 340/15.5 TS
3,212,599 10/1965 Johnsen....................... 340/15.5 MC
3,412,823 11/1968 DeBell.......................... 340/15.5 TS
3,283,295 11/1966 Montgomery................ 340/15.5 TS Primary Examiner—Malcolm F. Hubler
Attorney—Theodore E. Bieber

[57] ABSTRACT

A seismic data acquisition system and method wherein each geophone station is coupled to a data acquisition and telemetry unit module with individual modules being coupled to each other and a central recording station by a single data link such as a coaxial cable, a pair of conductors or radio link.

10 Claims, 3 Drawing Figures

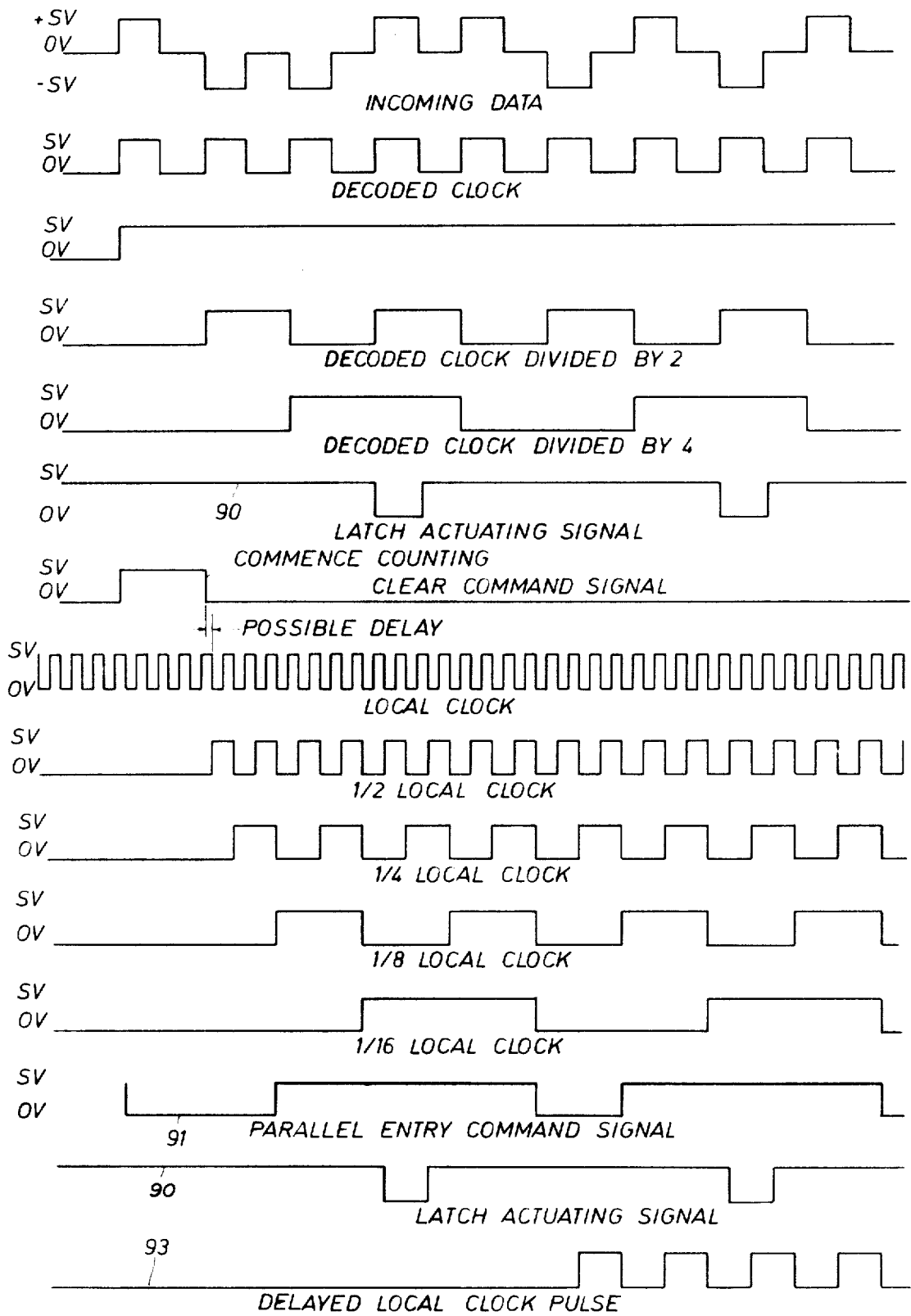

SEISMIC EXPLORATION SYSTEM

BACKGROUND OF THE INVENTION

The present practice in seismic exploration is to couple a large number of geophone stations to a central recording station by means of a multiple conductor cable. At the central recording station the geophone signals are passed through gain ranging amplifiers and analog-to-digital converters with the resulting digital signals recorded on magnetic tape. The recorded data is then processed by means of computers at a record processing station.

The use of a multiple conductor cable containing two individual conductors for each geophone station is a source of many problems in the present practice. For example, normally 48 or 96 geophone stations are used and thus require either 96 or 192 individual conductors in the geophone cables. While cables having this number of conductors are available, they are expensive and difficult to repair should a break occur in one of the conductors. In addition, it is time-consuming to identify the broken conductor so that it may be bypassed or repaired. Normally, connecting cables are handled by inexperienced personnel in the field and a considerable amount of damage to the cables does occur. Thus the expense of maintaining or replacing cables is considerable.

SUMMARY OF THE INVENTION

The present invention solves the above problems by providing a gain-ranging amplifier and analog-to-digital converting system at each geophone station. In addition, at each geophone station there is a data transmitting system for receiving the digital data from the preceding stations and retransmitting it and the data generated at the local station to the succeeding stations by means of a coaxial cable or other single transmission link. The use of the coaxial cable reduces the cable cost by a factor of about 100 while at the same time providing a cable which is relatively simple to repair should a break occur.

Each geophone station is normally composed of a number of geophones placed in a compact pattern and coupled together in a series-parallel arrangement. The individual geophones are positioned to cancel the normally occurring ground waves while adding the reflected waves. Thus when one speaks of 48 or 96 geophone stations, it normally assumes that each station uses a number of geophones, for example 16.

The use of coaxial cable for coupling the geophone stations provides an additional advantage in that it eliminates the channel cross-talk that occurs in normal multiple conductor geophone cables. Also the pickup of stray 60 Hertz current is greatly reduced. Further, when transmitting high level digital data, coaxial cables are insensitive to damp environments since their characteristic impedance is low (typically 75 ohms). In fact, the coaxial cables equipped with non-waterproof connectors can be operated under water without degradation of the digital data. An additional benefit is provided in that the shield of the coaxial cable may be charged with respect to ground when the system is not in use to provide improved rodent protection for the cable.

BRIEF DESCRIPTION OF THE DRAWINGS

The above invention will be more easily understood by those skilled in the art from the following detailed description of the preferred embodiment when taken in conjunction with the attached drawings in which:

FIG. 3 is a timing diagram of the data repeat transmitter.

DESCRIPTION OF THE PREFERRED EMBODIMENT

Figure 1:
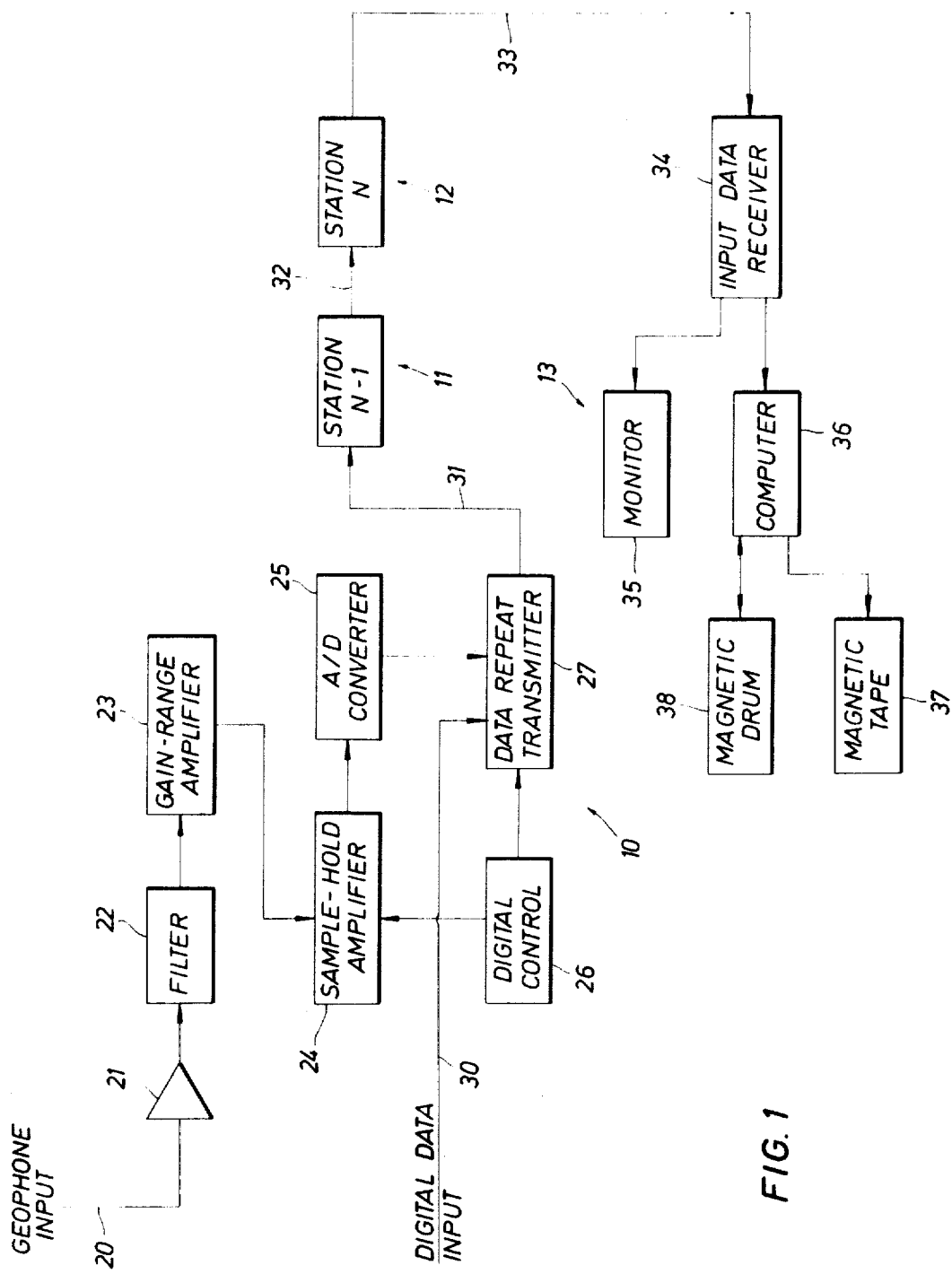
FIG. 1 shows a seismic system in block diagram form.

Referring to the drawing, there is shown a system having a number of stations, of which only three, 10, 11 and 12, are shown coupled to a central recording station 13. The details of the one station 10 are shown with the remaining stations being identical. The station 10 is provided with an input 20 from a geophone spread. As explained above, the geophone spread normally comprises a number of geophones spaced in a relatively small area in a pattern designed to cancel the responses from ground waves and add the responses from reflecting waves. For example, 16 geophones may be used and dispersed in a crucifix form. The incoming signal is supplied to a geophone preamplifier 21 whose output is coupled to a filter 22. Both the preamplifier and the filter are adjustable to vary the gain of the preamp and the cutoff frequency and time delay of the filter. The output of the filter is connected to a gain ranging amplifier 23 that may be any conventional design, such as that described in copending application, Ser. No. 864,998, filed Oct. 9, 1969 and assigned to the same assignee as this application. More particularly, the gain ranging amplifier is designed to match the gain of the amplifier with the amplitude of the input signal so that the output signal remains between preset maximum and minimum values as much as possible. In addition, the gain ranging amplifier supplies a gain code which indicates the gain setting of the amplifier. The output from the gain ranging amplifier is supplied to a sample and hold amplifier 24 that samples the output of the gain ranging amplifier at preset intervals, as determined by the digital control circuit 26. The digital control circuit is controlled by a local clock pulse supplied by clock 40 shown in FIG. 2, for example, a crystal controlled oscillator, that controls the operation of the complete data system. Thus the sample and hold amplifier will sample the output of the gain ranging amplifier at pre-determined intervals, for example, once every millisecond. The sameple and hold amplifier supplies a signal to an analog-to-digital converter 25 where the magnitude of the signal is converted to a digital number. This digital number and a digital number representing the gain of the seismic amplifier are then supplied to the data repeat transmitter 27 described below. The data repeating transmitter 27 also includes a digital data input 30 from the preceding data stations. The digital data received over the input 30 is partially stored (i.e., buffered) in the data repeat transmitter 27 and then re-transmitted under the control of the local clock pulse. The combination of gain ranging amplifiers and analog-to-digital converters are known to those skilled in the seismic art and equipment for performing these functions are available.

The digital data received over the input 30 is transmitted over a coaxial cable. As explained above, while a coaxial cable is shown, other types of data links may be used, such as a pair of wires or a radio link. Further, using time division multiplexing it is possible to put the data from up to 100 stations on a single coaxial cable where each station is sampled once each millisecond and each digital word occupies approximately 10 microseconds of time. For example, if the local clock pulse has a frequency of 3.6 MHz and the digital word representing the geophone signal comprises a 24 bit digital word, it is possible to transmit data from a maximum of 144 stations using a 1 millisecond sampling rate and a transmission rate of 6.94 microseconds per digital word. These limits are adequate for seismic systems where only low frequencies are of interest. The limits are also within the capabilities of present technology.

The data from the station 10 is transmitted over coaxial cable 31 to the station 11 which re-transmits the data and adds the data generated at station 11. The re-transmitted data is transmitted over a coaxial cable 32 to the station 12. The station 12 re-transmits the data adding its own data over the coaxial cable 33 to the central recording station 13.

Figure 2:
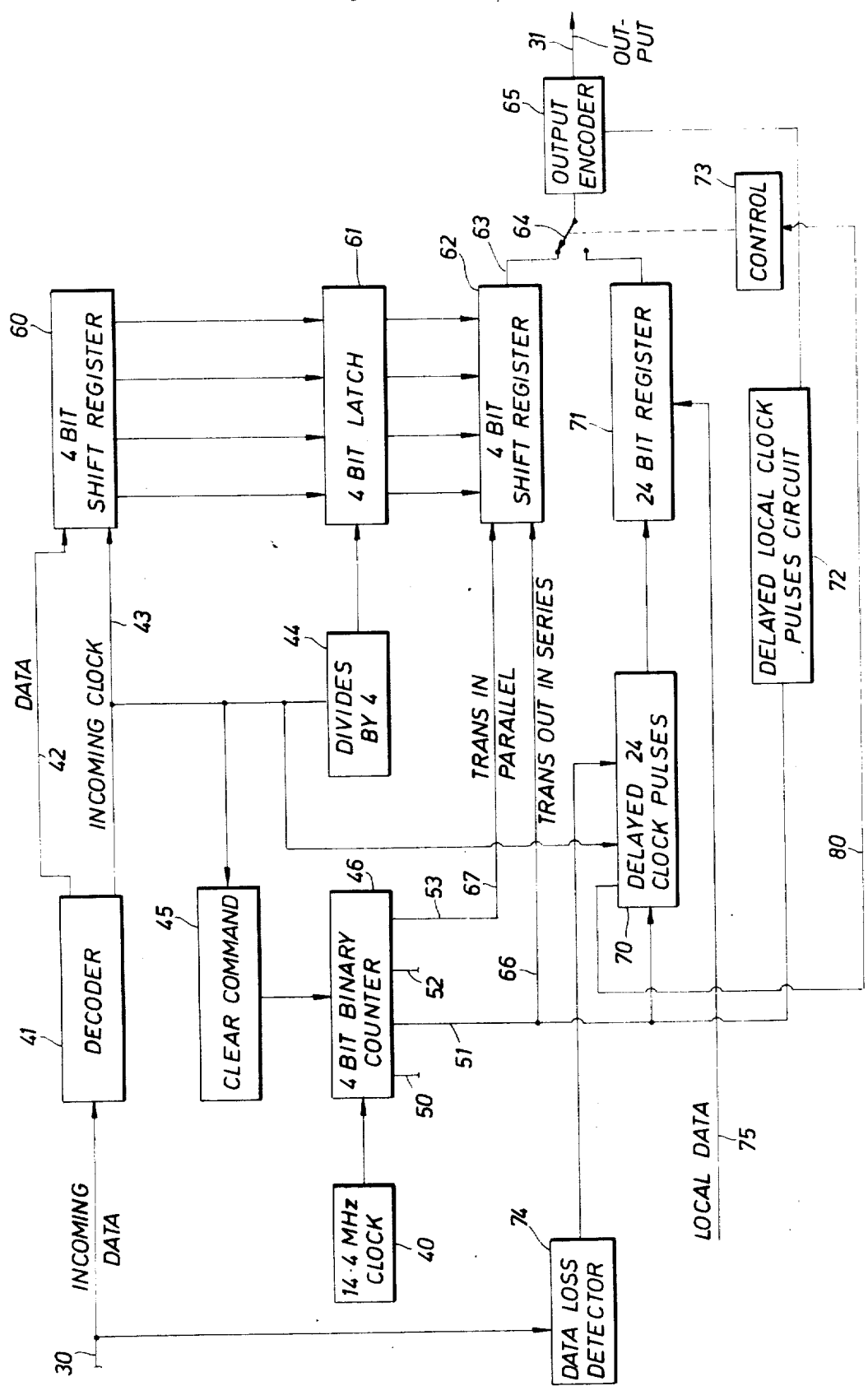
FIG. 2 is a block diagram of one data repeat transmitter.

Referring to FIG. 2, there is shown in block diagram form one of the data repeat transmitters 27 shown in FIG. 1. The transmitter includes a decoder 41 which decodes the incoming data into a data signal and incoming clock signal. The data signal is transmitted directly by a connection 42 to a four-bit shift register 60, while the incoming clock signal is transmitted by a line 43 to the shift register 60, a clear command 45 and a dividing circuit 44. The dividing circuit 44 divides the incoming clock signal by four to supply an actuating signal to a four-bit latch circuit 61. When the actuating signal is received, the shift register transfers the data in parallel form to the latch circuit. Thus the incoming data is converted from a serial to parallel form in the shift register and then transmitted in a parallel form to the latch circuit. The clear command 45 utilizes the incoming clock to generate a signal to clear the four-bit binary counter 46, The binary counter 46 is coupled to the local clock 40 and divides the local clock by factors of 2, 4, 8 and 16 and supplies resulting clock pulses on the leads 50, 51, 52 and 53. The frequency of the local clock 40 divided by four provides a local clock pulse having substantially the same frequency as the incoming clock pulse. Thus the local clock 40 has a frequency four times that of the clock pulses used for transmitting the data. In addition, the local clock should have an accuracy of approximately 0.025 percent. For example, the local clock could have a frequency of 14.4 megahertz, while the clock signal used for transmitting pulses would have a frequency of 3.6 megahertz. Thus the local clock would vary plus or minus 3,600 hertz and still remain an accuracy of plus or minus two cycles at the data transmission rate of one a frame per millisecond.

The frequency of the clock 40 divided by four is transmitted over a line 66 to a four bit shift register 62 while the frequency divided by sixteen is transmitted over a line 67 to the shift register 62. Thus the frequency divided by sixteen is used as a parallel entry command for triggering the four-bit latch circuit to transmit the data in parallel to the shift register 62. The frequency divided by four is used to transmit the data from the shift register 62 in a serial form over the line 63 and through the switch 64 to the output encoder 65. The two shift registers 60 and 62 in combination with the latch 61 form the memory of the system wherein the data is changed from the incoming time base to the time base of the local clock. The output encoder 65 also receives clock pulses from the delayed local clock pulse circuit 72. The circuit 72 delays the local clock pulses for four pulses to allow four bits of data to be entered in the shift register 62. The output encoder 65 encodes the data received from the shift register 62 using the local clock pulses as a time base for the data. The data is then transmitted over the coaxial cable 31 to the next station as described above.

The data from the local station is received over a lead 75 and is stored in the 24-bit register 71. The local clock pulses delayed in a circuit 70 are used to transmit the data from the 24-bit register to the switch 64 and the output encoder 65. The switch 64 is controlled by control circuit 73 which is operated by the delayed 24 local clock pulse circuit 70. The control 73 is designed so that it will shift the switch 64 to the alternate position after the data from the preceding stations have been re-transmitted. The control 73 can respond to an absence of incoming clock pulses received over a line 80 that are also used to operate the local clock pulse delay circuit 70. The transmitter also includes a data loss detector 74, which operates to cause the station to transmit its own data if no data is received from previous stations. More particularly, the data loss detector is provided with a 10 millisecond delay so that if no data appears on the coaxial cable 30 within the delay period, it will cause the 24-bit register 71 to transmit its data to the output encoder 65. The data loss detector will also initiate transmission of data since the data loss detector of one geophone station will time out first and initiate the transmission of data. Within a few cycles of operation the remaining stations will also initiate the transmission of data.

In the above description it is assumed that each geophone station samples the geophone signal at the same time. The actual instant at which the sample is taken is controlled by the local clock. The error in the above assumption is small since all clocks are crystal controlled to small tolerances. The maximum error will be considerably less than one millisecond and within the acceptable accuracy of seismic signals when using a clock having the above described accuracy.

FIG. 3 is a timing diagram of the data repeat station. As can be seen, the conversion of the data from an incoming clock pulse to a local clock pulse is accurate to within 1 pulse of the local clock 40. Since the local clock frequency is divided by four to obtain the clock pulse for re-encoding the data, the accuracy is better than one-fourth of a data clock pulse.

Each data repeat station, except the first station, receives data from the preceding station, stores it, and then re-transmits the data under the control of the local clock. When the data is received, the data pulses and clock pulses are decoded with the data pulses being stored in the buffer system. The clock pulses are used to generate a clear command signal for the counters used in dividing the local clock pulses to obtain the actuating pulses and the delayed local clock pulses. The decoded clock pulses divided by four are used to generate the latch pulse shown at 90. The latch pulse is used to parallel transfer the data from the shift register 60 to the latch register 61. The parallel entry pulses 91 and are generated from the local clock pulses and used to parallel transfer the from the 4 bit latch 61 to the shift register 62 local clock pulses 66 are used to serially transfer it to the encoder 65. The encoder 65 retransmits the data using the delayed local clock pulses 93.

The central recording station can be of conventinal design and include an input data receiver 34. The input data receiver should include means for converting the digital data to an analog form and arranging it so that all of the data from a particular station appears in sequence, thus the data from any station may be visually displayed on a monitor 35. The use of a monitor allows the operator to detect malfunctioning of equipment or erroneous data prior to moving the geophones to a new location. The digital data is also supplied to a computer 36 which re-arranges the digital data so that all the digital data pertaining to a particular station is recorded in sequence on a magnetic drum 38 or a magnetic tape 37.

The above-described central recording system is commercially available and is used in seismic operations to record the digital seismic data. While a particular sequence of recording has been described, obviously other sequences or arrangements may also be used. The present invention is directed to the problem of eliminating the need for multiple conductor seismic cables for connecting the individual geophone stations together and to the central recording system. As explained, this result is obtained by utilizing gain ranging amplifiers and analog-to-digital converters at each geophone station and transmitting the data over a data link in a digital form. Since each geophone station receives the data from the previous stations and re-transmits it under the control of its local clock adding its own data at the end, the amplitude of the geophone signals will be preserved as well as the time of occurrence of the measurements.

After the data has been recorded, it can be processed by conventional means to apply various corrections and filter techniques. The processed data can then be converted to a graphic form for study by geologists. Even though there may be a small difference in the exact time when the individual geophone signals were sampled, the total error will be less than a millisecond. This magnitude of error cannot be detected by a geologist in a graphic display.

We claim as our invention:

1. A seismic system comprising:
   a plurality of geophones, said geophones being divided into groups, each group forming a geophone station;
   a data acquisition system associated with each geophone station, each data acqustion station including a gain ranging amplifier means, an analog-to-digital conversion means, and data repeater and transmitter means, the geophones of each station being coupled to the gain ranging amplifier associated with the station, said gain ranging amplifier being coupled to the analog-to-digital converter, said analog-to-digital converter being coupled to said data repeater and transmitter means, and
   a central recording means, each of said data acqusition systems being coupled to the data repeater and transmitter means of the succeeding data acqusition system by a single data link, the last data acqusition system being coupled to said central recording system by a single data link, each of said data acqusition systems receiving digital data from the preceding data acqusition system, adding its own digital data and transmitting the received and added digital data to the succeeding station over said data link.

2. The seismic system of claim 1 wherein each of said data acquisition systems includes a local clock, storage means for storing the data received from the preceding station, and means for re-transmitting under the control of the local clock both the stored data and the data produced at the station.

3. The seismic system of claim 2 wherein said data link comprises a pair of conductors.

4. The seismic system of claim 2 wherein said data link comprises a coaxial cable.

5. The seismic system of claim 2 and in addition a data loss detector, said data loss detector actuating said data acqusition system after a preset time delay if no data is received from the preceding station.

6. The seismic system of claim 2 and in addition means for decoding said incoming data to obtain separate data and incoming clock pulses, a clearing means, said clearing means utilizing said incoming clock pulses to initiate the re-transmission of data under control of said local clock.

7. The seismic system of claim 6 wherein said storage means comprises a first shift register, a latch circuit and second shift register, said decoded data being supplied to said first shift register in serial form, then transferred to said latch circuit in parallel form and transferred to said second register in parallel form.

8. The method of seismic exploration comprising:
   establishing a plurality of geophone stations, each station containing at least one geophone;
   at each geophone station converting the seismic data to a digital form of data under the control of a local clock pulse;
   transmitting the digital data from each station to the succeding station;
   in addition re-transmitting from each station the digital data received from the preceding station, said re-transmitted data being transmitted under the control of the local clock of the station;
   transmitting the digital data from the last station to a central recording station under the control of the local clock of the last station.

9. The method of claim 8 and in addition decoding the incoming data to obtain the incoming clock pulse and using the incoming clock pulse to synchronize the local clock.

10. The method of claim 9 wherein the decoded incoming data is stored for a time period before it is re-transmitted under the control of the local clock.

* * * * *